United States Patent [19]

Hirota et al.

[11] Patent Number: 4,722,229

[45] Date of Patent: Feb. 2, 1988

[54] PRESSURE TRANSDUCER

[75] Inventors: Hisatoshi Hirota; Etsumi Nakano, both of Tokyo, Japan

[73] Assignees: Nihon Radiator Company, Limited; TGK Company, Limited, both of Tokyo, Japan

[21] Appl. No.: 928,452

[22] Filed: Nov. 10, 1986

[30] Foreign Application Priority Data

Apr. 17, 1986 [JP] Japan .......................... 61-58224[U]
Jul. 29, 1986 [JP] Japan .......................... 61-117105[U]

[51] Int. Cl.⁴ .......................... G01L 9/02; H01L 10/10
[52] U.S. Cl. .................................. 73/725; 338/32 R; 338/42
[58] Field of Search ................ 73/725, 719, 728, 722; 338/42, 32 R

[56] References Cited

U.S. PATENT DOCUMENTS 4,006,402  2/1977  Mincuzzi ............................ 338/32 R
4,602,513  7/1986  Hirota et al. .......................... 73/725

Primary Examiner—Donald O. Woodiel
Attorney, Agent, or Firm—Cushman, Darby & Cushman

[57] ABSTRACT

A pressure transducer having a magnetoresistive element and a magnet displaced with a diaphragm. A magnet supporting device is mounted on an element supporting device both for slidable movement in the displacement-direction of the magnet and for rotatable movement about an axis in the direction, so that the pressure transducer is capable of having a O-point adjustment and a magnetic sensitivity adjustment made independently of each other without interaction between the two when the transducer is assembled.

12 Claims, 8 Drawing Figures

PRESSURE TRANSDUCER

BACKGROUND OF THE INVENTION

1. Field of the Invention

The present invention relates to a pressure transducer for sensing the pressure of a gas or liquid for conversion of the pressure value to an electrical signal and then outputting the signal.

2. Description of the Related Art

U.S. Pat. No. 4602513 discloses a pressure transducer which has a housing provided in its head with a diaphragm displaceable by an external pressure; a magnetoresistive element, whose electric resistance is varied in response to changes in the magnetic field, fixed to the bottom of the housing; and a permanent magnet disposed opposite the magnetoresistive element and displaceable as the diaphragm is displaced.

This transducer is capable of measuring the external pressure by electrically detecting variations in the electric resistance of the magnetoresistive element. When the transducer is assembled, it is necessary to adjust the magnetic field strength which acts on the magnetoresistive element (magnetic sensitivity adjustment) and to adjust the positional relationship in the direction in which the magnet and element are displaced (O-point adjustment).

Then, this transducer is so designed that two holders for respectively holding the permanent magnet and the magnetoresistive element are adapted to be pressed and to yield at their ends by the action of adjustable screws provided for making the two adjustments.

With this adjustment method, one of the two adjustments, such as the magnetic sensitivity or O-point, is out when the other is made so that an adjusting operation involves repetition of the two adjustments and thus involves difficulty, requiring much time.

Besides, if the holders are caused to yield by such adjustments, the magnetoresistive element is caused to incline and the distance between the magnetoresistive element and the permanent magnet is varied when the magnet is displaced in detecting pressure. This will mean the failure to obtain a precise measurement.

Moreover, a characteristic of the magnetoresistive element is changed in accordance with changes in temperature. In addition, it has the property of a non-linear change with respect to temperature. Thus, difficulty is involved in compensating (temperature compensation) for the value detected in accordance with the temperature. The disadvantage derived from such a transducer is that a considerable number of errors are made in the measurements carried out in an environment where the temperature changes.

SUMMARY OF THE INVENTION

An object of the present invention is to provide a pressure transducer which is capable of readily making two adjustments such as a magnetic sensitivity adjustment and a O-point adjustment when the transducer is assembled.

Another object of the present invention is to obtain precise measurements.

According to the present invention, there is provided a pressure transducer for sensing the pressure of a gas or liquid and outputting an electric signal in response to the pressure detected comprising: a diaphragm displaceable in response to changes in the external pressure; a magnet which is displaced with the diaphragm such as to follow the displacement of the diaphragm; a magnetoresistive element, whose electric resistance is varied in response to changes in the magnetic field, disposed in a position opposed to the magnet; an element supporting device for supporting the magnetoresistive element; a magnet supporting device for supporting the magnet mounted on the element supporting device both for slidable movement in the displacement-direction of the magnet and for rotatable movement about an axis in the direction; and a fixing means for fixing the magnet supporting device and the element supporting device to each other.

BRIEF DESCRIPTION OF THE DRAWINGS

The present invention may be more fully understood from the description of a preferred embodiment of the invention set forth below, together with the accompanying drawings, in which.

DESCRIPTION OF THE PREFERRED EMBODIMENT

Figure 1:
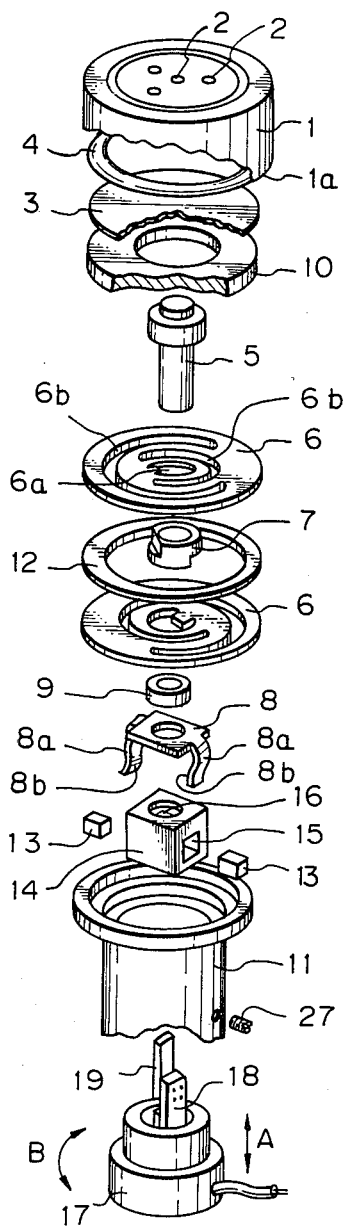
FIG. 1 is an exploded view of a pressure transducer.

One embodiment of the present invention will be explained with reference to the accompanying drawings.

A plurality of pressure induction ports 2 are bored through the top of a head housing 1 which has the form of an inverted bucket. The external pressure is led through the induction ports 2 to the interior of the head housing 1.

A diaphragm 3 formed of a thin disc-like sheet is displaceable vertically in the housing 1 by the external pressure acting along its inner wall and is disposed such as to hold a sealing O-ring 4 between the diaphragm 3 and the top of the housing 1.

A rod 5 is arranged to have its head abutted against the under surface of the diaphragm 3 centrally thereof and to be vertically displaced to follow displacement of the diaphragm 3.

The rod 5 passes through a mounting cylinder 7 and two leaf springs 6 with a ribbed opening 6a each are mounted on the mounting cylinder 7 unless the leaf springs 6 rotate. A magnetic conducting member 8 and a spacer 9, as well as the leaf springs 6 and the mounting cylinder 7, are integrally formed by caulking the lower end of the rod 5. Each of the leaf springs 6 is provided with a plurality of C shaped grooves 6b concentrically thereof. The two leaf springs 6 are disposed in such a manner that they are offset from each other at a mounting angle of 180° such as to uniformly apply bias in each direction.

A disc 10 in a doughnut form is positioned in close contact with the under surface of the diaphragm 3 at its outer rim. The leaf springs 6 and a spacer 12 are sandwiched in between a cylindrical barrel housing 11 and the disc 10. These members are integrally formed by caulking the lower end 1a of the head housing 1 such as to hold the barrel housing 11 in position.

Figure 2:
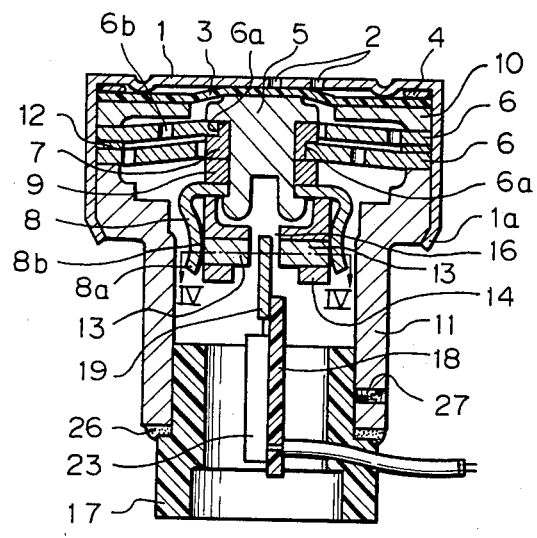
FIG. 2 is a sectional front view of the pressure transducer.
Figure 3:
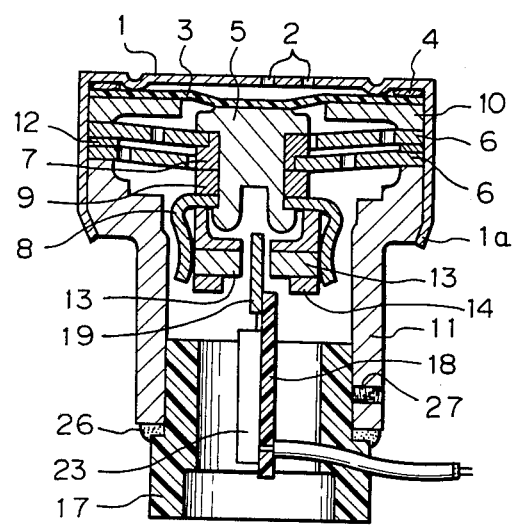
FIG. 3 is a sectional front view of the pressure transducer in the condition of being subjected to external pressure.

In this manner, the outer rims of the leaf springs 6 are held against the head housing 1 and the barrel housing 11 whereas the inner rims are secured against the rod 5 by means of the mounting cylinder 7. The leaf springs 6 are energized by the bias thereof to urge the rod 5 upwardly. As shown in FIG. 2, the rod 5 is normally urged upwardly by the leaf springs 6, and when the diaphragm 3 is subjected to the external pressure from above, the rod 5 is forced down, as shown in FIG. 3 and is stationary in a position where the bias of the leaf springs 6 are balanced against the external pressure.

The magnetic conducting member 8 which is secured to the lower end of the rod 5 is formed at its opposite ends with a pair of legs 8a. The legs 8a are formed such as to inwardly and then outwardly bend in the neighborhood of its lower ends, thereby defining crowns 8b in such a manner that the crowns 8b may be spaced from each other.

Figure 4:
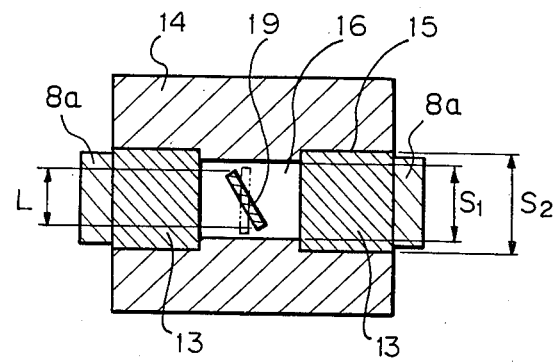
FIG. 4 is a sectional view of the pressure transducer taken along the line IV—IV of FIG. 2.

A magnet holder 14 is held in position between the pair of legs 8a and carries a pair of permanent magnets 13 at the opposite ends thereof. As shown in FIG. 4, the magnet holder 14 has holes bored therethrough at its opposite ends to form a pair of square holes 15 for receiving the permanent magnets 13 and further has a through hole 16 bored vertically therethrough such as to extend from its top to the square holes 15 with which it is in communication. The through hole 16 is dimensioned to provide a size $S_1$ which is smaller than the size $S_2$ of each of the square holes 15, thereby preventing the permanent magnets 13 from being forced from the interior of the square hole 15 into the through hole 16. In other words, the pair of permanent magnets 13 are received in the square holes 15 such as to face each other and to leave a space therebetween. In this connection, it is noted that one permanent magnet 13 may be employed. The crowns 8b formed on the legs 8a of the magnetic conducting member 8 abut against the tops of the permanent magnets 13 which are held in position in the magnet holder 14 to establish a magnetic circuit by means of which a magnetic flux is closed, thereby rendering the magnetic field stable.

In this manner, the permanent magnets 13 in this embodiment are supported to the barrel housing 11 by means of the rod 5 and the leaf springs 6 and are displaced with the diaphragm 3 to cause displacement thereof. Thus, the barrel housing 11 serves as a magnet supporting device for supporting the magnets 13. A base housing 17 is provided at its center with an elongated base plate 18 formed of an insulater vertically mounted in position. A magnetoresistive element 19, whose electric resistance value is varied in accordance with changes in the magnetic field, is bonded to the top of the base plate 18. Thus, the base housing 17 serves as an element supporting device for supporting the magnetoresistive element 19.

The magnetoresistive element 19 includes, for instance, a pair of indium-antimony alloy films whose electric resistance is varied under the influence of the magnetic field and which has the same characteristic each other, and connected vertically in series with each other as a unit around which synthetic resins, alumina or the like are sealed. The magnetoresistive element 19 is interposed between the two permanent magnets 13 such as to be subjected to the influence of the magnetic field.

Figure 5:
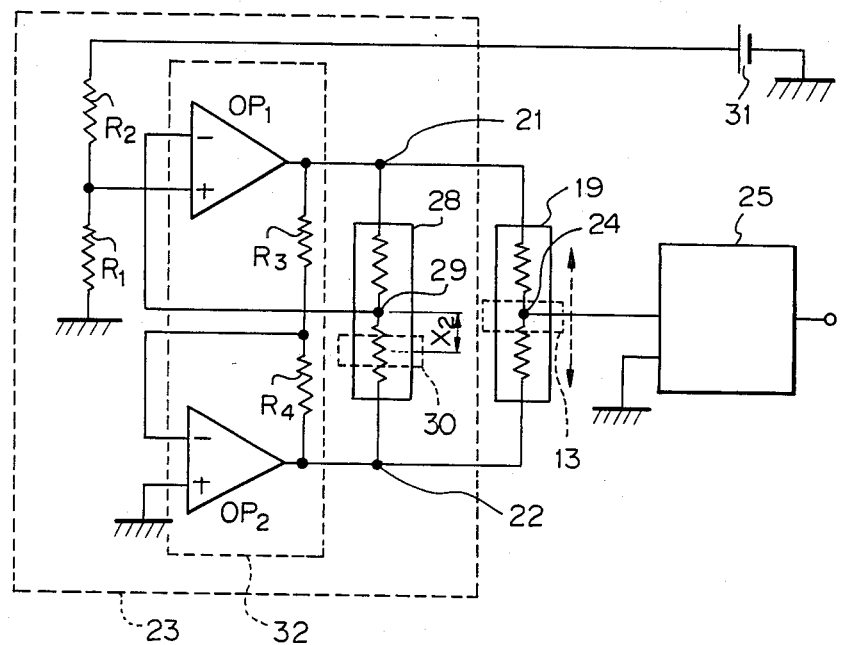
FIG. 5 is a circuit diagram of a signal output device for outputting an electric signal from the magnetoresistive element.

FIG. 5 shows a signal output device for outputting an electric signal in response to the electric resistance value of the magnetoresistive element 19. Voltage is applied to opposite terminals 21, 22 of the magnetoresistive element 19 by a voltage applying device 23 whereas an amplifier 25 is connected to an intermediate terminal 24 disposed centrally on the magnetoresistive element 19 to amplify the potential of the intermediate terminal 24 which is displaceable by the displacement of the permanent magnets 13. The output end of the amplifier 25 is connected to a control circuit or display device (not shown) which makes use of the output. The voltage applying device 23 will be detailed later.

The base housing 17 is adapted to have its top fitted into the lower end of the barrel housing 11. Both of the housings 17, 11 are arranged for vertically slidable movement and for rotatable movement about the axis thereof as indicated by arrows A, B in FIG. 1. That is, the barrel housing 11 is mounted on the base housing 17 both for slidable movement in the displacement-direction of the magnet and for rotatable movement about the axis in the direction. The housings 11, 17 are also made fast with adhesion or screw settings in a desired position (desired height, desired angle).

As for holding the two housings 11, 17 in position, vertical adjustment of the housings establishes the O-point adjustment. On the other hand, adjustment of the direction of rotation of the housing varies the effective width L of the magnetoresistive element 19 with respect to the magnetic flux, and the electric resistance value of the magnetoresistive element 19 is varied in proportion to the aforementioned change, thereby adjusting the magnetic sensitivity. In this manner, the pressure transducer is capable of having the O-point adjustment and the magnetic sensitivity adjustment made independently of each other without interaction between the two. After the respective adjustments have been made, the base housing 17 and the barrel housing 11 are held in position.

When the respective adjustments are made, neither the permanent magnets 13 nor the magnetoresistive element 19 is inclined with respect to the vertical axis so that the distance therebetween is always maintained such as to be constant when the permanent magnets 13 are vertically displaced. In the drawings, numerals 26 and 27 designate a fixing adhesive and a setting screw, respectively. The two housings 11, 17 may be made fast with one or both of the adhesive 26 and the screw 27, or the any other suitable means.

When the head or top of the pressure transducer of the present invention is placed in a high pressure gas or liquid, the external pressure is led through the pressure induction ports 2 to the interior of the head housing 1, and the diaphragm 3, as shown in FIG. 3, is displaced to a position where it is balanced against the bias of the leaf springs 6 and is then stationary. This will be followed by displacement of the rod 5 and the permanent magnets 13. On the other hand, the magnetoresistive element 19 is not displaced so that the positional relationship between the permanent magnets 13 and the magnetoresistive element 19 is varied by changes in the external pressure to thus change the electrical resistance value of the element 19. As a result, changes in the external pressure may be measured as an electric signal.

In this manner, the pressure transducer is capable of making the O-point adjustment and the magnetic sensitivity adjustment independently of each other without any interaction between the two when the transducer is assembled. Any adjustment may thus be readily made. Further, an error-proof and accurate measurement may be obtained since the distance between the magnetoresistive element 19 and the permanent magnets 13 are always maintained to be constant when the permanent magnets 13 are vertically displaced.

Now, the voltage applying device shown in FIG. 5 will be described.

The voltage applying device 23 is mounted on the lower part of the base plate 18 and includes a second magnetoresistive element 28 for temperature compensation which is connected in parallel with the magnetoresistive element 19. The second magnetoresistive element 28 is manufactured in the same lot as that of the first magnetoresistive element 19 and possesses the same temperature characteristic as it. The second magnetoresistive element 28 remains the same in terms of the characteristic change in response to temperature changes. The second magnetoresistive element 28 is provided at its center with an intermediate terminal 29 and with a second permanent magnet 30 which is secured at a distance $X_2$ from the intermediate terminal 29 and which has the same characteristic as that of each of the permanent magnets 13.

A DC power source 31 which is adapted to output a positive constant voltage $V_0$ is connected in series with two resistors $R_2$, $R_1$, and the one end of the resistor $R_1$ and the negative side of the power source 31 are grounded. A point intermediate between the resistors $R_2$, $R_1$ is connected to a positive input terminal of a first operational amplifier $OP_1$. The input terminal is maintained at a constant potential $$(e_2 = V_0 \cdot r_1/(r_1 + r_2)),$$

where $r_1$, $r_2$ are the resistance values of the respective resistors $R_1$, $R_2$. The intermediate terminal 29 of the second magnetoresistive element 28 is connected to the negative input terminal of the operational amplifier $OP_1$. The output terminal of the operational amplifier $OP_1$ is connected to one 21 of the opposite terminals 21, 22 of the two magnetoresistive elements 19, 28 connected in parallel with each other. Accordingly, the output voltage $e_0$ is output from the operational amplifier $OP_1$ to the terminal 21 so that the potential of the negative input terminal of the operational amplifier $OP_1$ (that is, the potential of the intermediate terminal 29 of the second magnetoresistive element 28), may be equal to the potential $e_2$ of the positive input terminal of the operational amplifier $OP_1$.

Two resistors $R_3$, $R_4$ having the same resistance values are connected in series with each other and are in turn connected in parallel with the magnetoresistive elements 19, 28 between the opposite terminals 21, 22 thereof. The point intermediate between the two resistors $R_3$, $R_4$ is connected to a negative input terminal of a second operational amplifier $OP_2$, the positive input terminal of which is grounded. Consequently, the voltage $-e_0$ is output from the operational amplifier $OP_2$ to the terminal 22 so that the potential of the point intermediate between the two resistors $R_3$, $R_4$ may be set at zero. Thus, a voltage control device 32 is adapted to control the voltage between the opposite terminals 21, 22 in response to a change in characteristic of the second magnetoresistive element 28 in order to maintain the potential of the intermediate terminal 29 of the second magnetoresistive element 28, and is formed by the two operational amplifiers $OP_1$, $OP_2$ and the two resistors $R_3$, $R_4$.

Operation of the voltage applying device 23 will be apparent from the description hereunder.

The potentials $e_0$, $-e_0$ of the terminals 21, 22 are controlled by the voltage applying device 32 so that the potential of the intermediate terminal 29 of the second magnetoresistive element 28 may be always maintained to be a constant potential $e_2$. This relation to the second magnetoresistive element 28 in this embodiment may be expressed by the following formula:

$$\Delta e_2 = f_2(t) \cdot 2e_0 \cdot B \cdot \Delta x_2 \tag{1}$$

where $f_2(t)$ is a proportional constant which fluctuates depending upon the temperature and is inherent in the second magnetoresistive element 28, and B is the magnetic flux strength.

Upon taking the first magnetoresistive element 19 into account, the potentials of the opposite terminals 21, 22 are put as $e_0$ and $-e_0$, and the output voltage of the intermediate terminal 24 is defined as $e_1$ when the permanent magnets 13 are displaced from the center at a distance $\Delta x_1$.

Thus, their relations may be expressed in the following formula:

$$\Delta e_1 = f_1(t) \cdot 2e_0 \cdot B \cdot \Delta x_1 \tag{2}$$

where $f_1(t)$ is a proportional constant which fluctuates depending upon the temperature and is inherent in the first magnetoresistive element 19. However, the two magnetoresistive elements 19, 28 which are used have the same temperature characteristics. Thus, the formula is $f_1(t) = f_2(t)$.

From the formulae (2)/(1), the following formula is obtained:

$$\Delta e_1 = \Delta x_1 \cdot \Delta e_2 / \Delta x_2 \tag{3}$$

where $\Delta e_2$ = constant, $\Delta x_2$ = constant, so that the amount $\Delta e_1$ of change in the output voltage from the intermediate terminal 24 of the magnetoresistive element 19 is proportional to the amount $\Delta x_1$ of displacement of the permanent magnet 13, irrespective of temperature change, to thus make a complete temperature compensation. As seen from the formula (3), B is eliminated therefrom, so that, for example, a ferrite magnet the flux strength of which fluctuates with changes in temperature or the like can be used without affecting temperature compensation so long as the permanent magnets 13, 30 have the same characteristics.

As set forth hereinbefore, the pressure transducer is capable of effecting full temperature compensation. This entirely results from the fact that fluctuation in the output from the intermediate terminal 24 derived from the temperature change is compensated for by change in the voltage $2e_0$ (that is, the output voltage to the first magnetoresistive element 19) between the opposite terminals 21, 22.

More specifically, it is understood from the formula (2) that the change $\Delta e_1$ in the potential of the output from the intermediate terminal 24 is proportional to $f_1(t)$ and $2e_0$, whereas from the formula (1) it follows that $2e_0$ is inversely proportional to $f_2(t)$, and that from the equation $f_2(t) = f_1(t)$ the influence of temperature change is not exerted at all on $\Delta e_1$ since for example, if $f_1(t)$ is $1/\alpha$ times due to temperature change, $2e_0$ is then $\alpha$ times.

Figure 6A:
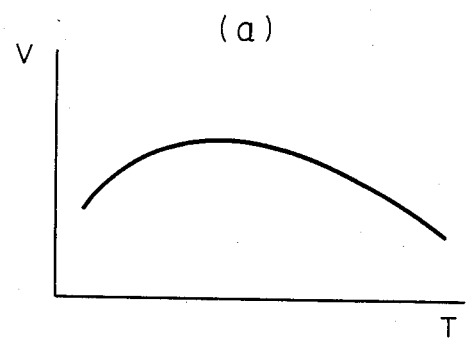
FIGS. 6a–c are graphs showing changes in the voltage of opposite terminals of the magnetoresistive element and in the electric potential of an intermediate terminal thereof.
Figure 6B:
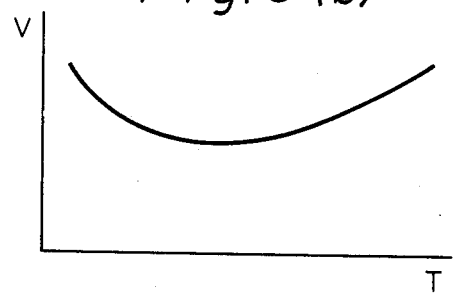
Figure 6C:
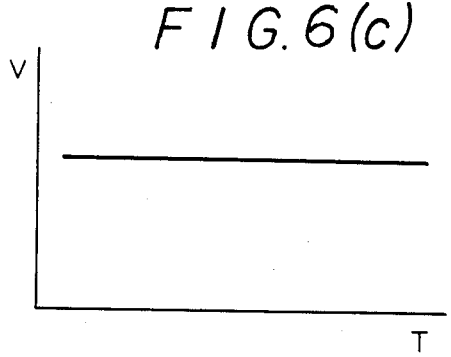

FIG. 6(a) shows changes in the potential of the intermediate terminal 24 according to temperature changes when a constant voltage is applied to the opposite terminals 21, 22 of the magnetoresistive element 19. FIG. 6(b) shows changes in the voltage applied to the opposite terminals 21, 22 of the magnetoresistive element 19 in accordance with temperature changes. FIG. 6(c) shows the potential of the intermediate terminal 24 when the voltage is applied to the opposite terminals 21, 22. In FIG. 6, T indicates temperature and V indicates voltage.

In this embodiment, the potentials of the opposite terminals 21, 22 are $e_0$ and $-e_0$, and the output voltage from the intermediate terminal 24 is zero ($e_1=0$) when the permanent magnets 13 are in the center of the magnetoresistive element 19 (viz, $\Delta x_1=0$), so that the equation $\Delta e_1=e_1$ is obtained. Thus, the output voltage $e_1$ from the intermediate terminal 24 is proportional to the amount of displacement of the permanent magnets 13, and is amplified by the amplifier 25.

Although this embodiment has been described with reference to the magnetoresistive element which comprises upper and lower halves having the same electric resistance, they may be different from each other in electric resistance. In such case, the resistance values of the resistors $R_3$, $R_4$ should be proportional to the resistance value of the halves and different from each other.

As mentioned hereinbefore, since the amount of the output voltage from the intermediate terminal of the magnetoresistive element is proportional to the amount of displacement of the magnet irrespective of temperature change, the pressure transducer is capable of detecting extremely accurately the amount of displacement without being influenced by temperature changes and is very simple in structure so that excellent temperature compensation can be effected.

While the invention has been described by reference to a specific embodiment chosen for the purposes of illustration, it should be apparent that numerous modifications could be made thereto by those skilled in the art without departing from the basic concept and scope of the invention.

We claim:

1. A pressure transducer for sensing the pressure of a gas or liquid and outputting an electric signal in response to the pressure detected comprising:
   a diaphragm displaceable in response to changes in the external pressure,
   a magnet which is displaced with said diaphragm such as to follow the displacement of the diaphragm,
   a magnetoresistive element, whose electric resistance is varied in response to changes in the magnetic field, disposed in a position opposed to said magnet,
   an element supporting means for supporting said magnetoresistive element,
   a magnet supporting means for supporting said magnet mounted on said element supporting means both for slidable movement in the displacement-direction of the magnet and for rotatable movement about an axis in said direction, and
   a fixing means for fixing said magnet supporting means and said element supporting means to each other.

2. A pressure transducer according to claim 1, wherein said diaphragm is urged against the external pressure by a spring, and said magnet is supported to said magnet supporting means by means of said spring.

3. A pressure transducer according to claim 1, wherein said magnet supporting means defines a housing of the pressure transducer.

4. A pressure transducer according to claim 1, wherein said element supporting means defines a housing of the pressure transducer.

5. A pressure transducer according to claim 4, wherein said means for supporting the magnet defines a second housing and wherein both said housings are mounted on each other for slidable movement and rotatable movement.

6. A pressure transducer according to claim 5, wherein said fixing means is an adhesive.

7. A pressure transducer according to claim 5, wherein said fixing means is a screw.

8. A pressure transducer according to claim 5, wherein said magnet consists of a pair of permanent magnets oppositely mounted such as to be spaced apart from each other.

9. A pressure transducer according to claim 8, wherein said magnetoresistive element is disposed between said pair of permanent magnets.

10. A pressure transducer for sensing the pressure of a gas or liquid and outputting an electric signal in response to the pressure detected comprising:
    a diaphragm displaceable in response to changes in the external pressure,
    a magnet which is displaced with said diaphragm such as to follow the displacement of the diaphragm,
    a magnetoresistive element, whose electric resistance is varied in response to changes in the magnetic field, disposed in a position opposed to said magnet,
    an element supporting means for supporting said magnetoresistive element,
    a magnet supporting means for supporting said magnet mounted on said element supporting means both for slidable movement in the displacement-direction of the magnet and for rotatable movement about an axis in said direction,
    a fixing means for fixing said magnet supporting means and said element supporting means to each other, and
    a signal output means for outputting an electric signal corresponding to the electric resistance value of said magnetoresistive element.

11. A pressure transducer according to claim 10, wherein said magnetoresistive element has opposite terminals and an intermediate terminal, and wherein said signal output means includes a voltage applying means adapted to apply the voltage between said opposite terminals of said magnetoresistive element, the potential of said intermediate terminal being output as the electric signal.

12. A pressure transducer according to claim 11, wherein said voltage applying means comprises a second magnetoresistive element having the same temperature characteristic as that of said first magnetoresistive element and connected in parallel therewith, a magnet rigidly secured to said second magnetoresistive element to space said magnet away from said intermediate terminal of said second magnetoresistive element at a distance, and a voltage control means for controlling the voltage of said opposite terminals such as to keep the potential of the intermediate terminal of said second magnetoresistive element constant.

* * * * *